Patented July 12, 1932

UNITED STATES PATENT OFFICE

FRANZ WIENERS, OF OPLADEN, AND WILHELM BAUER, OF LEVERKUSEN-WIESDORF, GERMANY, ASSIGNORS TO GENERAL ANILINE WORKS, INC., OF NEW YORK, N. Y., A CORPORATION OF DELAWARE

WATER SOLUBLE SULPHURIC ACID ESTER OF ANTHRAQUINONYL-DIPHENYL-TRIAZINE-CARBOXYLIC ACID AMIDE

No Drawing. Application filed June 4, 1931, Serial No. 542,198, and in Germany June 5, 1930.

The present invention relates to a new water soluble yellow sulphuric acid ester derived from leuco-alpha-anthraquinonyl-diphenyl-triazine-carboxylic acid amide.

In accordance with the invention the leuco compounds of alpha-anthraquinonyl-diphenyl-triazine-carboxylic acid amide is caused to react with sulphur trioxide or an agent yielding the same, such as chlorosulfonic acid or an ester thereof, in the presence of a tertiary organic base, such as pyridine, dimethylaniline, etc., and, if desired, converting the resulting acid sulphur acid ester into a stable salt.

The ester, which is thus obtained in a very good yield, is distinguished by the fact that it produces on textile fibres, especially wool and cotton, when developed in a suitable manner, clear greenish-yellow shades of very good fastness properties, especially to light. The dyestuff serving as the starting material is obtained in a smooth manner and in a very pure state by converting diphenyl-1.3.5-triazine-mono-carboxylic acid (Berichte der deutschen chemischen Gesellschaft, vol. 23, page 2382) in a suitable high boiling organic solvent, such as, for example, nitrobenzene or trichlorobenzene, into the chloride by heating with thionyl chloride, and causing the resulting product to react with alpha-aminoanthraquinone in the usual manner.

The following examples illustrate our invention, without, however, restricting it thereto:—

Example 1

484 parts by weight of the dry leuco compound of alpha-anthraquinonyl-diphenyl-triazine-carboxylic acid amide of the formula:—

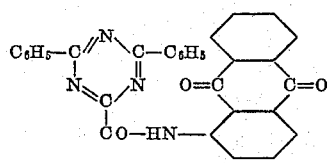

are introduced into an esterification mixture consisting of 4000 parts by weight of pyridine and 650 parts by weight of the methyl ester of chlorosulfonic acid, and heated with stirring to 50° C. in the course of half an hour in a current of carbon dioxide. After heating for one hour, the mixture is allowed to cool somewhat and is then introduced into an excess of sodium carbonate solution. The pyridine is blown off by means of steam. The ester is separated from the yellow filtered solution in the form of the potassium or ammonium salt. The salts form pure yellow small crystalline plates, which are readily soluble in warm water. A greenish-yellow precipitate of the dyestuff separates from the deep yellow solution on the addition of a mineral acid and a weak oxidizing agent, such as ferric chloride. The ester yields on vegetable or animal fibres, on being developed with oxidizing agents after dyeing or printing in an appropriate manner, very clear greenish yellow shades of good fastness properties.

Example 2

484 parts by weight of the dry leuco compound of alpha-anthraquinonyl-diphenyl-triazine-carboxylic acid amide are introduced into an esterification mixture consisting of 2500 parts by weight of dimethylaniline, 2000 parts by weight of chlorobenzene and 650 parts by weight of chlorosulfonic acid, and heated with stirring to 45° C. in the course of half an hour in a current of carbon dioxide. After heating for one hour, the mixture is introduced into an excess of sodium carbonate solution. The dimethylaniline and chlorobenzene are blown off by means of steam. The ester is separated from the filtered solution in the form of the potassium or ammonium salt.

The ester probably corresponds in its free form to the formula:—

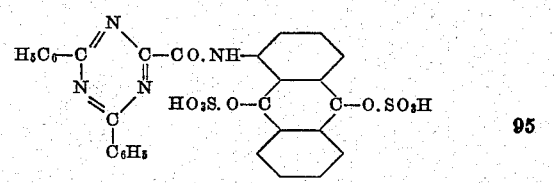

It may be employed for dyeing purposes, for example, in the following manner:—A dyeing bath is prepared by dissolving the ester in water with the addition of about 4% of acetic acid (calculated on the fibre to be dyed). This dyeing bath is heated to about 60–100° C., whereafter wool is dyed within the same for half an hour. Then, 2% of formic acid are added, and the dyeing process is continued for half an hour, likewise at 60–100° C. The dyeings are then developed by means of an aqueous sodium bichromate-acetic acid solution in the usual manner.

Printing with the new ester may be performed, for example, in the following manner:—

6 parts by weight of the ester are dissolved in a hot solution consisting of:—

5 parts by weight of diethanol-sulfide and 29 parts by weight of water. The solution is mixed with 50 parts by weight of neutral starch tragacanth thickening, 4 parts by weight of ammonium thiocyanate solution 1:1, 4 parts by weight of sodium chlorate solution 1:3, 2 parts by weight of ammonium vanadate solution 1:100.

The paste is printed on cotton, the print is steamed for five minutes, rinsed, malted and afterwards boiled with soap for ten minutes.

We claim:—

The new water soluble sulphuric acid ester having in its free form the probable formula:—

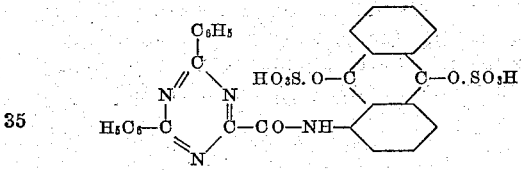

said ester yielding when developed on textile fibres clear greenish-yellow shades of excellent fastness properties.

In testimony whereof, we affix our signatures.

FRANZ WIENERS.
WILHELM BAUER.